United States Patent [19]
Harrison

[11] Patent Number: 5,956,401
[45] Date of Patent: Sep. 21, 1999

[54] IN-SERVICE MONITORING IN COMMUNICATIONS NETWORKS

[75] Inventor: Neil Harrison, Harlestone, United Kingdom

[73] Assignee: British Telecommunications public limited company, London, United Kingdom

[21] Appl. No.: 08/776,571

[22] PCT Filed: Aug. 4, 1995

[86] PCT No.: PCT/GB95/01856

§ 371 Date: May 19, 1997

§ 102(e) Date: May 19, 1997

[87] PCT Pub. No.: WO96/04726

PCT Pub. Date: Feb. 15, 1996

[30] Foreign Application Priority Data

Aug. 4, 1994 [EP] European Pat. Off. .............. 94305797

[51] Int. Cl.[6] ...................................................... H04L 9/00
[52] U.S. Cl. ................................................................ 380/9
[58] Field of Search ........................... 370/522; 340/506; 380/9

[56] References Cited

U.S. PATENT DOCUMENTS 3,866,217 2/1975 Bennett, Jr. ............................. 340/506
5,265,096 11/1993 Parruck .................................. 370/522

OTHER PUBLICATIONS

*Ericsson Review*, Vo. 64, No. 3, 1987, pp. 102–109, XP 000026786, "Optical Fibre Line System for 4×140 Mbit/s, a new 565 Mbit/s Application," Anna–Karin Hansson.

*Primary Examiner*—Salvatore Cangialosi
*Attorney, Agent, or Firm*—Nixon & Vanderhye P.C.

[57] ABSTRACT

A communications path not using a deterministic signal frame structure is provided with performance monitoring by using known Alarm Indication Signal (AIS) type monitoring on the path but scrambling traffic signals in a scrambler to avoid them being mistaken for an AIS. At the receiving end of the path the received signals are monitored for the presence of an AIS, followed by a descrambler to unscramble the received signals before transmitting them to a receiving piece of CPE. An adverse state detector may also be provided, to avoid the scrambler scrambling traffic signals to that they look like an AIS.

29 Claims, 3 Drawing Sheets

| Cycle | SCRAMBLER | | | | | | | DESCRAMBLER | | | | | |
|---|---|---|---|---|---|---|---|---|---|---|---|---|---|
| | Customer I/P | Network I/P | x | x2 | x3 | Σ O/P | x4 | Customer O/P | x | x2 | x3 | Σ O/P | x4 |
| 1 | 1 | | 1 | 1 | 1 | 0 | 1 | | 1 | 1 | 1 | 0 | 1 |
| 2 | 1 | | 1 | 1 | 1 | 0 | 1 | | 1 | 1 | 1 | 0 | 1 |
| n-1 | 1 | 1 | 1 | 1 | 1 | 1 | 1 | 1 | 1 | 1 | 1 | 1 | 1 |
| n | 1 | 1 | 1 | 1 | 1 | 0 | 1 | 1 | 0 | 1 | 1 | 0 | 0 |
| n+1 | 1 | 0 | 0 | 1 | 0 | 0 | 0 | 1 | 0 | 0 | 1 | 0 | 1 |
| n+2 | 1 | 0 | 0 | 0 | 1 | 0 | 1 | 1 | 0 | 0 | 0 | 0 | 1 |
| n+3 | 1 | 0 | 0 | 0 | 0 | 0 | 1 | 1 | 0 | 0 | 0 | 0 | 0 |
| n+4 | 1 | 0 | 1 | 0 | 0 | 0 | 0 | 1 | 1 | 1 | 0 | 0 | 0 |
| n+5 | 1 | 1 | 0 | 1 | 0 | 0 | 0 | 1 | 0 | 0 | 1 | 0 | 0 |
| n+6 | 1 | 0 | 1 | 0 | 1 | 0 | 0 | 1 | 0 | 1 | 0 | 0 | 0 |
| n+7 | 1 | 1 | 0 | 1 | 0 | 0 | 1 | 1 | 0 | 0 | 1 | 0 | 1 |
| n+8 | 1 | 0 | 1 | 0 | 1 | 0 | 0 | 1 | 0 | 1 | 0 | 0 | 0 |
| n+9 | 1 | 0 | 0 | 1 | 0 | 0 | 1 | 1 | 1 | 0 | 1 | 0 | 1 |
| n+10 | 1 | 1 | 1 | 0 | 1 | 0 | 0 | 1 | 1 | 1 | 0 | 0 | 0 |
| n+11 | 1 | 1 | 1 | 1 | 0 | 0 | 1 | 1 | 1 | 1 | 1 | 0 | 1 |
| n+12 | 1 | 0 | 0 | 1 | 1 | 0 | 0 | 1 | 0 | 0 | 1 | 0 | 0 |
| n+13 | 1 | 1 | 1 | 0 | 1 | 0 | 1 | 1 | 1 | 1 | 0 | 0 | 1 |
| n+14 | 1 | 1 | 1 | 1 | 0 | 0 | 1 | 1 | 1 | 1 | 0 | 0 | 1 |
| n+15 | 1 | 0 | 0 | 1 | 1 | 0 | 0 | 1 | 0 | 0 | 1 | 0 | 0 |
| n+16 | 1 | 1 | 1 | 1 | 1 | 0 | 1 | 1 | 1 | 1 | 1 | 0 | 1 |

IN-SERVICE MONITORING IN COMMUNICATIONS NETWORKS

BACKGROUND OF THE INVENTION

1. Field of the Invention

The present invention relates to means for monitoring communications networks, in particular arrangements for detecting faults affecting traffic signal paths.

2. Related Art

It is desirable in most, if not all, communication networks, that there should be some form of in-service monitoring, so that failure of a part of the network is detected promptly and can be dealt with. There are many ways in which a failure may be detected and some form of indicator is normally required.

Usually, if a piece of equipment fails, it emits an alarm. The alarm may indicate what kind of failure has occurred.

Downstream of the failed equipment, in a signal path, further pieces of equipment may detect that a failure has occurred upstream, for instance because of signal loss. These downstream pieces of equipment might also then each issue an alarm. To prevent misleading generation of multiple alarms from downstream equipment suffering signal loss or perturbation, it is known for the first piece of equipment downstream from a fault to emit instead an Alarm Indication Signal (AIS). This is not itself an alarm but indicates that an alarm has been generated. It then prevents all the following equipment in the signal path from generating their own alarms. Without the AIS, a fault might otherwise be difficult to locate and diagnose.

Digital communications systems used by network operators have an established practice in which a loss of signal detected by a piece of equipment downstream from a fault in a path causes the equipment to send an AIS. This is normally in the form of a continuous stream of digital "1"s. The AIS could be in any other form defined and recognised by the network in question, but digital "1"s have been found particularly appropriate.

The AIS must be detectable and generally AIS detection criteria are set at a threshold of a given number of continuous digital "1"s, or a given density of "1"s over a certain span of bits. The AIS may be set at a relatively high level so that detection is not assumed after only a short string of "1"s. Because network performance is important to both customer and network operator, both the time and the number of incidents for which an AIS is triggered may be recorded.

Communication paths are available at various bit rates or rates of data transmission to suit the customer's requirements. At the high data rates there is sometimes a deterministic frame structure. A deterministic frame structure is one in which a source sends a signal with a well defined structure at the binary level in the form of overhead plus payload. At lower data rates, such as at 64 Kbit/sec, there tends to be no generic deterministic frame structure.

'Structured' services usually take the form of a standardised path overhead (such as a periodic framing pattern perhaps with a CRC-type function which can be used for monitoring purposes) and a well defined payload area for the, usually non-deterministic, customer traffic signal. An example of a structured signal is the G.704/G.706 ITU recommended frame structure for the 2048 kbit/s network layer path signal. In this example the path overhead is defined in Timeslot 0 (which contains, amongst other functions, both a frame alignment signal and a CRC), and the payload the customer can use is, in most cases, the remaining 31 Timeslots of the frame in some format (thus giving the customer a maximum aggregate 1984 kbit/s payload channel).

Many network operators offer services which take the form of giving the customer the whole bit rate of the digital path in question. For example, this could be a n×64 kbit/s path (where n=1,2,3 . . . to some limit perhaps) or a higher bit rate hierarchical network layer, such a 2048 kbit/s or 34368 kbit/s path. This creates a problem for the network operator offering such a service because there is no tgeneric frame structure requirement imposed on the signal at the binary level (either by the customer or the network operator) which can be used by the network operator to monitor the end-to-end performance of the path at the binary level. In this specification such service offerings will be referred to as 'unstructured'.

A particular problem with unstructured services is thus that the network operator might not be quickly (if at all) aware of path failures. In some cases this information is first provided by the customer.

In public telecommunications networks systems where quality of service and continuity of service are specified to very high levels, if not guaranteed, an extra path can be provided for back-up purposes. This extra path will generally take a different route from the primary path to assist in providing the level of service being supplied to the customer. In a standard service, however, only one traffic carrying path will be provided on an end to end basis because the provision of an additional end to end path would significantly increase cost .

For reasons of economy, it is therefore desirable that capacity for monitoring a standard service be derived purely from the path which carries the traffic. For instance, as mentioned above, it is known to use an Alarm Indication Signal (AIS), which is commonly a signal comprising all "1"s. This particular all "1"s AIS is widely used (and defined in the international standards bodies such as the ITU) because for one reason it is easily implemented in practice in a wide range of terminal equipment.

However, there is a problem in that an AIS cannot be used in the traffic path without restricting the form of traffic carried in some way so that it does not inadvertently mimc an AIS.

SUMMARY OF THE INVENTION

According to a first aspect of the present invention there is provided a communications system for transmitting communications signals on a communications path, the communications path comprising one or more elements capable of outputting an alarm indication signal for transmission on the path in response to a fault condition arising, wherein a scrambler is provided for scrambling communications signals input to the path for transmission thereon, and a descrambler is provided, to descramble the transmitted, scrambled communications signals, said one or more elements lying between the scrambler and the descrambler, and where an alarm indication signal detector is provided between the scrambler and the descrambler for detecting alarm indication signals carried by the path.

The alarm indication signal may, for instance, comprise a series of repeated bits, such as all "1"s, in a digital communications system.

Embodiments of the present invention can then provide communication paths dedicated to the use of a specific customer wherein the customer's signal is scrambled at the input to the communications path and unscrambled before being received by the customer's equipment at the end of the path. This allows the customer ostensibly to use an all "1"s signal for his own purposes, such a signal in practice being scrambled while carried by the path and therefore not detectable as an AIS by the AIS detector at the receiving end of the path.

According to a second aspect of the present invention there is provided a method of monitoring a communications path for faults occurring which affect traffic on the path, including the steps of scrambling traffic signals to be transmitted on the path, transmitting said scrambled traffic signals along the path, monitoring the path for an AIS, and unscrambling the traffic signals by means of an unscrambling device.

Embodiments of the invention can detect in particular an AIS occurring on the path between a point where the traffic signals are scrambled and where they are unscrambled.

According to a third aspect of the present invention, there is provided a network terminating unit (NTU) for use with a communications path in a network, at least one element of the path having means to output an AIS on the path in the event of a fault occurring upstream with respect to it in the path, wherein the NTU has means for inputting a traffic signal to the path for transmission thereby, scrambler means for scrambling the traffic signal prior to transmission on the path, descrambling means for descrambling traffic signals received from the path, and AIS detecting means for detecting an AIS being transmitted on the path, the AIS detecting means being arranged in the NTU to receive the scrambled traffic signals from the path, or an AIS in the event that an AIS is transmitted on the path.

Thus, using two NTUs as described above, in an embodiment of this invention, a customer's data may be scrambled as it transits a first NTU (Network Terminating Unit), at a first end of the path, and descrambled as it transits a second NTU at a second end of the path. Each NTU may be used to connect individual customer terminals, for instance data terminals, to a telecommunications network.

Many of the paths currently operating at any network level, for example n×64 kbit/sec, 2048 kbit/sec, 8448 kbit/sec and 34368 kbit/sec and provided as a standard service, do not have a deterministic frame structure comprising payload and overhead. Embodiments of this invention could be used to provide performance monitoring functions for these paths.

The following is a discussion of network failures which might be detected by triggering an AIS.

There are generally two types of network failure: a first is the 'hard' failure, where a true loss of a signal (at some network layer) occurs and for which AIS will persist in all downstream client layers until either automatic or manual restoration is effected; and a second is the 'soft' failure, where a transient but gross disturbance of a network layer signal occurs and that network layer loses path alignment. In such a case both the affected network path layer and all client path layers go through a complex loss and recovery of frame alignment until normal operation is resumed. The key point to note here is that the network self-recovers without any form of intervention.

The first type of failure is rather obvious and its implications are easily understood. The second type of failure is, however, more interesting and its implications need to be clearly understood to optimise the solution.

The soft failure is usually a consequence of short but intense error bursts in networks (for example, as small as 10 $\mu$s at 140 MbitIs). A key facet of this effect, is that each client layer loses and recovers frame alignment due to corruption of the justification process, which either inserts an extra bit or deletes a traffic bit from the client layer signal. This effect is known as an 'uncontrolled bit-slip'.

Examining the effect of an uncontrolled bit-slip as it ripples through the successive client network layers shows a complex pattern of random error events (with a bit error density probability, pe=0.5) intertwined with very short bursts of AIS. The AIS occurs due to the detection of loss of frame alignment at a given layer and persists until such time as the layer in question recovers frame alignment.

It is generally accepted by the man skilled in the art of error performance that the above described soft failure phenomenon can be interpreted as giving rise to a severely errored seconds (SES)—both at the network layer of origin and in all supported client network layers. In the case of a hard failure, AIS is usually a permanent state (until manual or automatic restoration is effected) and hence SES events are easily measured.

One of the most important parameters to measure from the perspective of both the network operator and the customer is the state of Unavailability. The customer and network operator might also have contractual performance agreements on 'Service Availability', such that it is highly desirable that such a measurement can be performed accurately in-service.

A path is usually defined to enter the Unavailable state (from the Available state) at the onset of a period of several consecutive Severely Errored Seconds (SES). Within the ITU Recommendations on error performance, namely G.821 and G.826, this is currently defined to be 10 consecutive SES. Exit of the Unavailable state (to the Available state) is usually defined at the onset of a period of several consecutive non-SES. Within the aforementioned ITU Recommendations this is currently defined to be 10 consecutive non-SES.

A further parameter which has been found important to measure is 'Short-Breaks' (SB). A SB is defined in this patent as a number of consecutive SES which terminate before the threshold which defines the onset of Unavailability. A SB event terminates on the first non-SES. For example, and in consideration of the above discussion, a SB could be defined as a period of between say 3 and 9 consecutive SES. Moreover, such events could be measured as a single class, or they could be sub-divided into several class intervals, with the frequency of SB events in each class interval measured.

If the availability and error performance is to be recorded, a method of measuring it needs to be devised. Since the key measurements are Unavailability and Short Breaks, and since both are based upon the SES, this measure could be the occurrence of the SES. That is, from the above it is clear that the SES (also defined in the above named ITU Recommendations) is the key primary parameter to measure.

Performance information can either be reported immediately to a network management centre as it occurs, or stored at the NTU where it is measured and then reported once say, every 24 hours, either in response to a polled request or by means of a known autodialling system. Whether immediate or deferred reporting is required will depend upon the nature of the impairment and the maintenance philosophy of the network operator. For example, it could be decided that all unavailability events are always immediately reported (and perhaps stored), whilst occasional SES events are generally stored and only reported in response to polling from a network management system.

In order to implement embodiments of the present invention, there might be provided a network terminating unit (NTU), for use in a communications path, having means for receiving an incoming digital traffic signal, scrambler means for scrambling the traffic signal, and transmission means for transmitting the scrambled signal along a path. A second NTU might then be provided at the far end of the path, to receive the scrambled signal. The second NTU will then be provided with a descrambler.

The size of any scrambler/descrambler used will affect network performance. If there is a disturbance at some point then the greater the number of stages in the scrambler the greater the time taken for the disturbance to filter through the descrambler and the greater the time to settle back to normal operation after the disturbance. There are therefore distinct advantages in using a scrambler with a small number of stages. Using a scrambler with a relatively simple generator polynomial, such as $G(x)=x^4+x+1$, the scrambler can be implemented in practice in only four stages. This particular function, $G(x)$, is an example of a primitive polynomial.

Using a scrambler with a small number of stages does lead to the risk that incoming data for a particular state of the scrambler could generate a sequence of digital "1"s of greater length than the threshold length n which is set to detect an AIS. In such circumstances the detection of the AIS would be false. In order to overcome this and prevent such an event occurring it is proposed to incorporate an Adverse State Detector which can be used to move the scrambler to a different state. The Adverse State Detection system checks the scrambled traffic signal transmitted into the network by the first NTU. If a persistent stream of digital "1"s is detected then the adverse state detector invokes a change of state of the scrambler.

BRIEF DESCRIPTION OF THE DRAWINGS

The invention will now be described in detail with reference to the attached drawings in which.

DETAILED DESCRIPTION OF EXEMPLARY EMBODIMENTS

Figure 1:
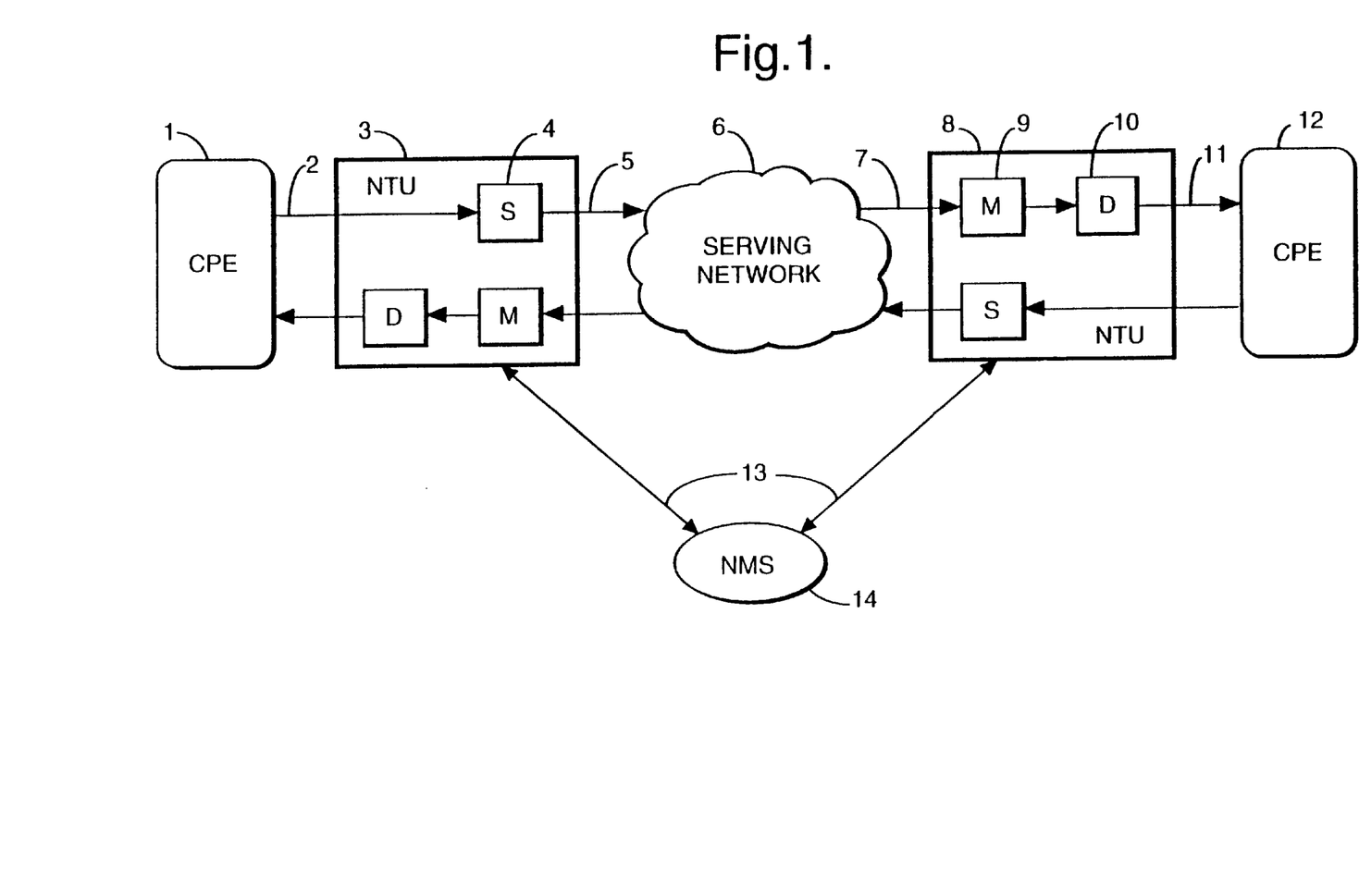
FIG. 1 shows a general configuration of a single network connection with facilities for in-service performance monitoring.

FIG. 1 shows a simple network in which the signal flow is described from left to right. (Similar considerations apply to signals flowing in the reverse direction). A piece of Customer Premises Equipment (CPE) 1 is connected via a path 2 to a first NTU 3. The NTU 3 provides connection to an allocated path of a serving network 6, over which signals can be carried to a second NTU 8 and delivered to different CPE 12 over path 11.

In this arrangement, an AIS might be generated by a number of different types of fault affecting the path in the serving network 6. An AIS can usually be generated by any equipment in a network in response to an immediately upstream fault. This includes for instance multiplexers or elements of line systems such as regenerators or repeaters. An AIS arising in the allocated path of the serving network 6 will be carried to the second NTU 8 and it is there that it needs to be distinguishable from ordinary traffic carried by the serving network to that NTU 8.

In order to make customer traffic signals distinguishable from an AIS sourced from in the serving network 6, the customer traffic signals are scrambled at the transmitting NTU 3 before being input to the path 5. On arrival at the second NTU 8, everything carried by the path 5 of the serving network 6 goes to an AIS detector and measurement unit 9 in the second NTU 8. The detector and measurement unit 9 detects the incoming signals and if an AIS, for instance a continuous sequence of digital "1"s, is detected for longer than a predetermined period, an AIS is deemed to have been detected. Additionally, any one second time period which has an AIS condition present in it is deemed to be an SES. The second NTU 8 is also provided with a descrambler 10. If no AIS is detected (i.e. for instance if there is not a continuous sequence of "1"s which exceed a preset threshold n) then the signal is passed to the descrambler 10 where it is descrambled before passing out of the second NTU 8, along the connection 11 to the second CPE 12. A similar process occurs for the signals transmitted in the other direction, i.e. from right to left in the Figure.

The two NTUs 3, 8 may be interchangeable, both having a scrambler and a descrambler in their transmitting and receiving sections respectively.

This embodiment enables a customer to use the full bandwidth of the path with a performance monitoring function being provided but without the extra expense of providing additional bandwidth for the performance monitoring.

Reporting performance data and/or specific events to the Network Management System (NMS) 14 may be, for example, by a dial-up PSTN link (public switched telephone network), by dial up ISDN (Integrated Services Digital Network) or by X25. Once the reports have been received by the NMS 14 then appropriate action can be taken.

On unstructured digital paths 5,6,7 the customer can generate any binary sequence of '1s' and '0s' usually without restriction. Hence, if the customer signal can be prevented from generating a sequence of greater than say n consecutive binary '1s' into the serving network 6 (i.e. from transmitting NTU 3), and n is chosen optimally in respect of the foregoing discussion, then if a sequence of greater than n consecutive binary all '1s' is detected at the receiving NTU 8 this can be attributed as sourced from within the serving network infrastructure 6 (i.e. a true AIS signal) and can be associated with a SES event occurring.

The probability of the scrambler generating a consecutive sequence of binary '1s' is a function of both the input customer signal sequence and the state of the scrambler at any point in time. This probability can, perhaps, be made arbitrarily small by using a scrambler (and descrambler) with many stages. However, as indicated above, a large number of stages in the (self-synchronising) scrambler/descrambler equates with a proportionately increased delay in regaining scrambler/descrambler synchronisation (say due to error events) and there could be increased cost implications. Moreover, the probability of the scrambler not generating a sequence of greater than say n binary '1s' cannot be reduced to zero in any case.

One method of ensuring that the scrambler cannot generate a consecutive sequence of greater than n binary '1s' is to use an adverse state detector mechanism within the design of the scrambler 4. This mechanism checks the binary sequence sent into the network 5, 6, 7 from the NTU 3, and if it detects a persistent stream of all '1s' the mechanism invokes a change of state of the scrambler 4. A similar system can be used at the descrambler 10 to correct for this aberration (though this can be omitted on cost grounds if required the implications of doing this are covered later).

Figure 2:
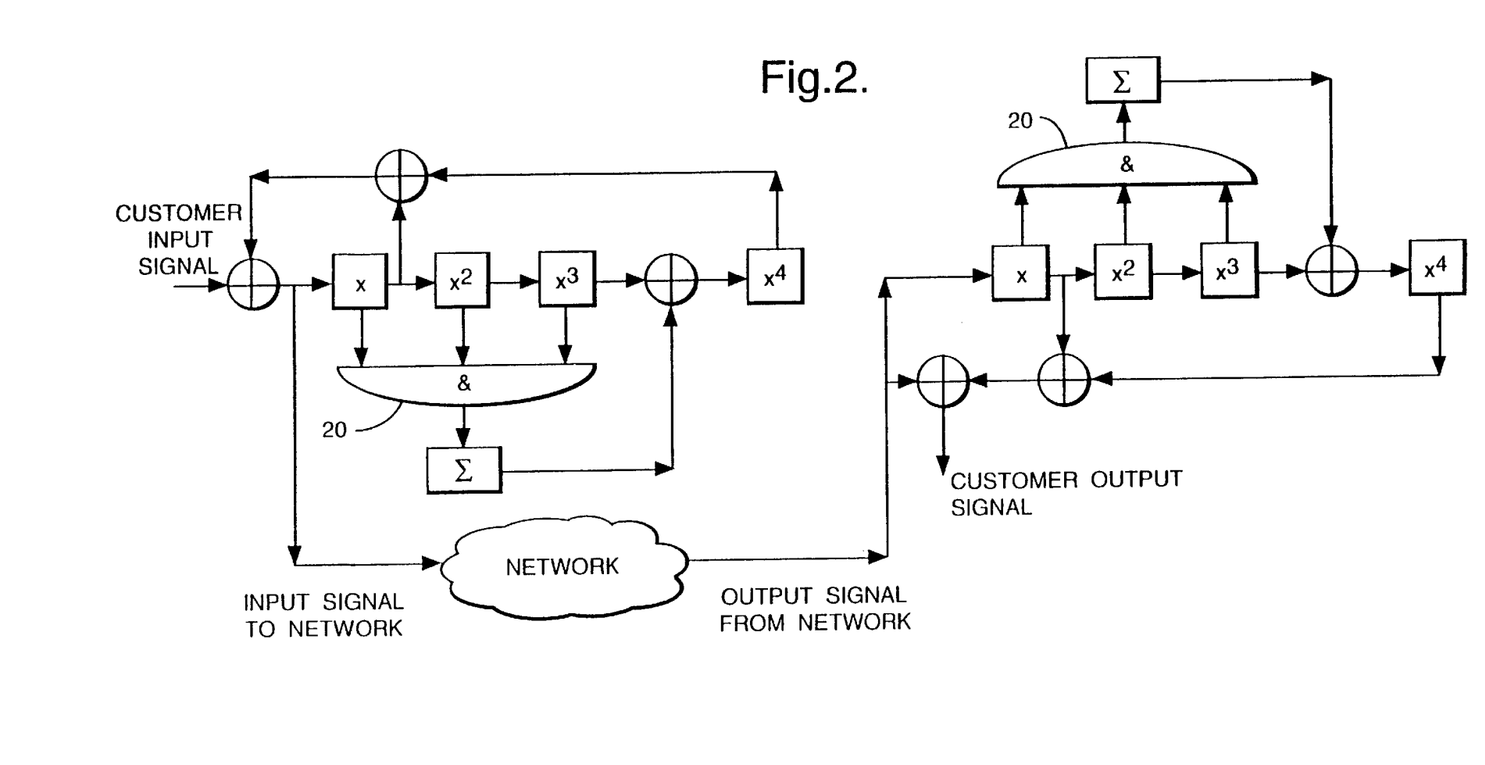
FIG. 2 shows an example of a self-synchronous scrambler/descrambler with an example of a type of adverse state detection mechanism.

FIG. 2 is an example of a suitable scrambler. This scrambler operates a small number of stages. This is possible because a simple generator polynomial has been used. It is of the form $G(x)=x^4+x+1$. This simple polynomial can be implemented in just four stages. The small number of stages is advantageous in ensuring the descrambler regains synchronisation in a short period—4 clock periods for the example given—after the disturbing event ends.

The example adverse state detector shown consists of an AND gate 20, which logically summates the outputs from the three delay stages x, $x^2$ and $x^3$ of the scrambler/descrambler. The AND gate is assumed to be at logic state 1 when all three delay stages are at logic state 1. A summation device $\Sigma$ counts the number of clock cycles that the outputs of the three delay stages stay at logic state 1. An exclusive OR gate, shown between delay stages $x^3$ and $X^4$, has the function of inverting the value of the delay stage $x^4$. So if during operation of the scrambler all four delay stages are set at 1, and the customer data input signal is also 1, then the output signal to the network will also be 1. This prevails for so long as the customer signal remains at 1. The summation device will then count the number of clock cycles that delay stages x, $x^2$ and $x^3$ remain at 1. Whilst this remains below a preset threshold the output logic state of the summation device remains at 0. Once the threshold is reached the summation device output is set to logic state 1 which, on the next clock cycle, sets the value in delay stage $x^4$ to 0. The action of reaching threshold causes the summation device to reset its count and output stages. With complementary adverse state mechanisms at both scrambler and descrambler, the aberration is corrected at the descrambler. An example of this scrambler and the particular sequence of operation is given in FIG. 3.

Figure 3:
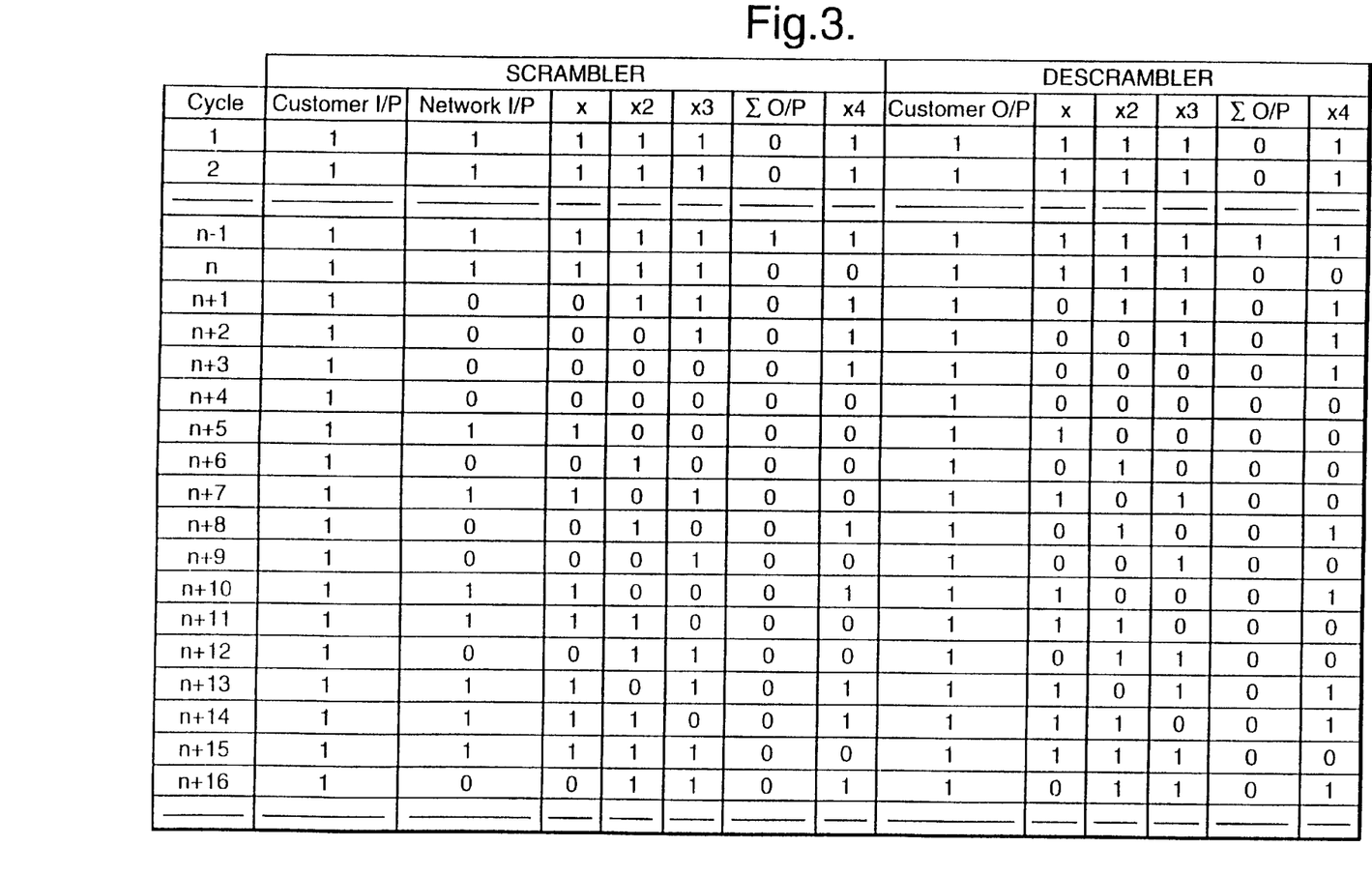
FIG. 3 is a table showing an example of adverse state detection on a scrambler/descrambler.

At cycle n+4 it can be seen than the scrambler/descrambler delay stages are all set to '0'. If, at this point, the customer data became a persistent sequence of consecutive '0s' then the NTU output to the network would also become a sequence of '0s' for as long as the customer sequence of consecutive '0s' persisted. This certainly does not present a problem for the invention as claimed, nor should it be a problem for the network, assuming that all network transmission systems encountered have been designed to cope with this, i.e. there are no spectral or timing issues.

Although not proved here, it can easily be shown that whatever initial state the scrambler and the descrambler are in (e.g. both different), they both become synchronised (i.e. have the same state) under error-free conditions after a maximum of 4 clock cycles in the example given—or more generally, after a number of clock cycles equal to the number of delay stages in the scrambler/descrambler. This is indeed how the self-synchronous scrambler/descrambler recovers after any period of gross disturbance, such as a large error burst or a break in transmission.

It should be noted that any single transmission error gets multiplied by the number of feedback taps of the descrambler. In most cases this will be 3 as in the example given above. Hence, one could argue that G(x) should also be a primitive polynomial of the least number of terms. However, since most error events are bursty in nature this point is perhaps academic, and the simple 'multiply by the number of feedback taps' rule no longer holds. Indeed, a precise analysis requires an exact knowledge of both the error burst characteristic and the state of all elements in the system.

It is possible to remove the adverse state detection mechanism at the descrambler (it must remain at the scrambler). With the example type of adverse state detector shown in FIG. 2 (i.e. inversion of the last delay stage only), this leads to only a single binary error at the descrambler for each operation of the adverse state detector at the scrambling end. The removal of the adverse state detector at the descrambler will be examined again later from a consideration of the need for transparent transmission of AIS to the customer.

The bounds on the adverse state detector threshold and its relationship with AIS are considered below. Before any bounds can be determined for each network layer it is important to understand how AIS manifests itself in networks, which in turn requires an understanding of how the scrambler/descrambler will behave under such network aberrations and what the effects are on the original signal. In turn, this requires a consideration of the parameters associated with AIS events since this is the key to determining what performance measurements are possible.

The way in which AIS manifests itself has already been discussed previously, where it was noted that 'soft failures' can result from error events in server network layers, and that an uncontrolled bit-slip can propagate through the client network layers.

The implications of an uncontrolled bit-slip for an unstructured signal with bit rates at or above the primary network layer of the Plesiochronous Digital Hierarchy (PDH) is that the descrambler will be affected by the extra or deleted bit in a similar fashion to an error event. That is, the descrambler will need to recover synchronisation and the time taken will be proportionate to the number of stages in the descrambler—for the example scrambler/descrambler embodiment given this could be up to 4 clock cycles. In practice, since the uncontrolled bit-slip will invariably be accompanied by surrounding error activity this effect is not that significant. The key point to note however, is that a self-synchronising scrambler/descrambler will 'process out' the uncontrolled bit-slip and recover synchronous operation.

Experimental work has shown that a 2048 kbitis primary rate path signal structured in accordance with ITU Recommendation G.704 and G.706 will recover framing and normal operation about 1 to 2 ms immediately after the point at which the disturbance which caused loss of framing is removed. It is understood that a longer reframe period (say 3 to 6 ms) might apply to the 1544 kbit/s primary rate path signal structured in accordance with ITU Recommendation G.704. Since the n×64 kbit/s network layer is usually synchronous with any serving primary rate network layer, a corresponding period of disturbance will also exist in the n×64 kbit/s path signal.

Events of the above type give rise to an effective bit error probability of 0.5 over the period of disturbance, and since they are troublesome to certain customers it is important that they can be measured. Moreover, it is interesting to note that a bit error probability of 0.5 over about 2 ms represents a BER (Bit Error Ratio) of about 10–3 over 1-second. From a G.821 or G.826 perspective, such an event can be considered to be a SES. Moreover, it is generally accepted by experts in the field of error performance that a loss of framing event at any network layer can be considered to constitute a SES event at that layer and all supported client layers.

When a structured network layer path signal loses frame alignment (or experiences a loss of signal) it generates an AIS downstream as described previously. Since the adverse state detector in the NTU prevents the scrambler from generating a consecutive sequence of more than n (say)

binary '1s', then a sequence of greater than n binary '1s' detected at the receiving NTU can be deduced to originate from within the network and hence can be associated with a SES event. The next step, therefore, is to determine a method for setting the value of n at the various network layers at which unstructured services might be offered by network operators.

A scrambler of m stages cannot generate a consecutive sequence of '1s' greater than $2^{m-1} -1$ when running through its maximal cycle for a constant input of "0"s or "1"s. If, in the example embodiment of an adverse state mechanism given, the summation device threshold is greater than $2^{m-1} -1$, but less than a larger value n say, then any sequence of greater than n binary all '1s' can be associated with an AIS (and hence SES) event from within the serving network infrastructure.

For the example embodiment of the scrambler shown (i.e. 4 stages) this means that the threshold of the adverse state detector mechanism should be set greater than 7. Hence, suppose the adverse state detector threshold was set at 10, then any sequence of greater than 10 consecutive binary '1s' detected at the receiving NTU would be considered to be an AIS (and hence SES) event from within the serving network infrastructure.

The above can, of course, be generalised to other embodiments of scrambler and adverse state detection mechanism as required. However, it is worth noting that bursts of AIS associated with loss of framing at network layers above the primary rate can be quite small, and so a scrambler device should be chosen which does not generate long sequences of '1s' during its maximal cycle, when the input is a continuous sequence of "1"s or "0"s.

In order to make the system flexible so that it can cope with the various path layers at which unstructured services could be offered in different network hierarchies, the value of the threshold at which the adverse state detector operates and the threshold at which an AIS land hence SES) event is detected at the receiving NTU should both be made independently programmable. The independently programmable range for each threshold type could be different.

From these considerations the definition of a detection criterion for a SES at a receiving NTU which could be used at various network layers could be as follows:

A SES is deemed to have occurred on an unstructured path when n or more consecutive binary 1s are detected in any 1-second period, where n is programmable over the range 10 to 100 (say) in unit steps.

Correspondingly, the threshold at which the adverse state detection mechanism operates at the scrambler 4 and the descrambler 10 could be defined as follows:

The adverse state detection mechanism of the scrambler operates when a consecutive sequence of R binary '1s' is detected going into the network from the transmitting NTU, where R is programmable over the range $2^{m-1}$ to n (say); where m is the number of stages in the scrambler and n is the independently programmable threshold set for the detection of a SES event at the receiving NTU.

The adverse state detection mechanism of the descrambler operates when a consecutive sequence of R binary '1s' is detected coming into the receiving NTU from the network. R is programmable over the range $2^{m-1}$ to n (say). Where m is the number of stages in the descrambler and n is the independently programmable threshold set for the detection of a SES event at the receiving NTU.

The adverse state detection threshold set in the transmitting NTU scrambler and in the receiving NTU descrambler should be the same.

A mechanism has been described which resides before the descrambler in the receiving NTU 8 and whose function is to detect SES and AIS. In one example embodiment given previously, if a period of true AIS is input to the descrambler, and the descrambler has an adverse state detection mechanism as shown in FIG. 2, then the descrambler will, with period $2^{m-1}$, insert a '0' into the output signal transmitted towards the second receiving end of the path 11 to the CPE 12, i.e. there will be a sequence of $2^{m-1} -1$ consecutive '1s' followed by a '0', and this pattern will repeat as long as the AIS persists into the descrambler.

This might or might not be a problem. However, if the customer expects to see the AIS on network failures some method of allowing the AIS to be output to the customer will be required.

There are several ways this could be achieved, and some examples are as follows:

i) Removal of the adverse state detection mechanism at the descrambler altogether.

ii) The detection of AIS at the input to the descrambler disables the adverse state detection for the duration of the AIS. Noting that this could allow one or two operations of the adverse state detector (i.e. insertion of '0s' into the customer signal output with period $2^{m-1}$) before it is disabled.

iii) Detection of AIS at the input to the descrambler causes a 'bypass' function, of both the descrambler and its adverse state detection mechanism, whereby the customer output signal is forced to the all '1s' state for the duration of the AIS.

The obvious merit of the first option is its simplicity and potential cost saving in the equipment and its operation—though in practice this might be trivial. The merit of the other two options is retention of the adverse state detector for correction of customer generated sequences of all '1s'.

A further point which should be noted here is the relative frequency of network-sourced error events compared to the frequency of operation of the adverse state detector at the scrambler. Consider the case where an adverse state detection mechanism was not implemented at the descrambler (noting that it must be retained at the scrambler). It has been noted previously that, for the example embodiment given, this results in a single error at the descrambler output for each operation of the scrambler adverse state detector. However, it should also be noted that errors can occur at the output from the descrambler due to error events sourced from within the serving network infrastructure 6 in normal operation. If the frequency of errors arising in the serving network is significantly greater than those which would arise due to operation of the adverse detection mechanism at the scrambler, then perhaps this could be a valid argument for removing the adverse state detection mechanism at the descrambler.

The above invention has been described with respect to all network layers which do not have a deterministic frame structure and it will be readily apparent to the person skilled in the art that the implementation of the embodiment is merely given by way of example and that the scrambler/descrambler could have a different number of stages, and the precise nature of the AIS could also be changed.

What is claimed is:

1. A communications system for transmitting communications signals on a communications path in the provision of unstructured services, the communications path comprising at least one element outputting an alarm indication signal for transmission on the path in response to a fault condition arising, said communications system comprising:

a scrambler for scrambling communications signals input to the path for transmission thereon, a descrambler to descramble the transmitted, scrambled communications signals, said at least one element lying between the scrambler and the descrambler, and an alarm indication signal detector disposed between the scrambler and the descrambler for detecting alarm indication signals carried by the path.

2. A communications system as in claim 1 wherein the scrambler includes:

an adverse state detector for detecting a communications signal which, when scrambled by the scrambler, would be detected as an alarm indication signal by the alarm indication signal detector, and means to modify the scrambler output in response to an output from the adverse state detector to thereby avoid the scrambled communications signal being detected as an alarm indication signal by the alarm indication signal detector.

3. A communications system as in claim 1 wherein the path is in a communications network.

4. A communications system as in claim 3, further comprising:

at least two user terminals, one user terminal being connected to provide user generated communications signals to the scrambler for transmission on the path, and another user terminal being connected to receive descrambled communications signals from the path.

5. A communications system as in claim 1 wherein:

the communications path is bidirectional, there being provided a scrambler and a descrambler at each of at least two access points to the path, such that the path transmits said scrambled communications signals, when generated, in both directions between the access points.

6. A communications system as in claim 1 for use in digital communications, wherein:

the alarm indication signal comprises a sequence of repeated bits, and the alarm indication signal detector is set to detect an alarm indication signal when it receives at least a minimum number of the repeated bits.

7. A communications system as in claim 6 wherein:

the sequence of repeated bits comprises all ones.

8. A communications system as in claim 6 wherein:

the scrambler includes an adverse state detector for detecting a communications signal to be transmitted on the link which, if scrambled, would cause the alarm indication signal detector to detect an alarm indication signal, the adverse state detector responding to detection of such a signal by modifying one or more bits of the signal to be transmitted such that it will not trigger the alarm indication signal detector.

9. A communications system as in claim 8 further comprising:

means complementary to the adverse state detector and downstream thereof for detecting a communications signal modified by the adverse state detector and, in response, reversing the modification.

10. A communications system as in claim 1 wherein the scrambler comprises:

a self-synchronous scrambler which scrambles the communications signals by use of a generator polynomial.

11. A communications system as in claim 10 wherein the generator polynomial is a primitive generator polynomial.

12. A communications system as in claim 10 wherein the scrambler comprises not more than six stages.

13. A communications system as in claim 12 wherein the scrambler comprises not more than four stages.

14. A method of monitoring a communications path for faults occurring which affect the path, including the steps of:

scrambling traffic signals to be transmitted on the path, transmitting said scrambled traffic signals along the path, monitoring the path for an alarm indication signal, and unscrambling the traffic signals by means of an unscrambling device disposed at a path output.

15. A method as in claim 14 wherein the path comprises:

an unstructured path, the full capacity of the path being available to customer traffic.

16. A method of monitoring a digital communications path as in claim 14 in which:

the traffic signals are scrambled by a self-synchronous scrambler at a first end of the path and descrambled at a second end by use of descrambling means.

17. A method of monitoring a digital communications path as in claim 14, in which the alarm indication signal comprises a series of digital ones.

18. A method as in claim 14 in which:

i) a scrambler at the first end of the path scrambles incoming traffic signals, ii) an adverse state detector monitors the traffic signals to detect an adverse state in the traffic signal for which the signal, when scrambled, fulfills the requirements for detection of an alarm indication signal, and iii) if such an adverse state is detected, the adverse state detector triggers a modification of the scrambled, transmitted traffic signal.

19. A method as in claim 18 wherein the adverse state detector monitors the traffic signals subsequent to their being scrambled.

20. A method as in claim 19 in which the adverse state comprises a continuous stream of n digital ones where n is a predetermined threshold which is lower than a predetermined threshold for detecting an alarm indication signal.

21. A method as in claim 20 in which the predetermined thresholds are independently programmable.

22. A method as in claim 14 in which, on detection of an alarm indication signal, an automatic output is made to a remote management center.

23. A network terminating unit for use with a communications path in a network in the provision of unstructured services, at least one element of the path having means to output an alarm indication signal on the path in the event of a fault occurring upstream with respect to it in the path, wherein the network terminating unit comprises:

descrambling means for descrambling traffic signals received from the path and alarm indication signal detecting means for detecting an alarm indication signal transmitted on the path, the alarm indication signal detecting means being arranged in the network terminating unit to receive the scrambled traffic signals from the path, or an alarm indication signal in the event that an alarm indication signal is transmitted on the path.

24. A network terminating unit as in claim 23, wherein the network terminating unit further includes means for outputting an alarm indication signal in the event that an alarm indication signal is detected by the detecting means.

25. A network terminating unit as in claim 23 further comprising:
   an adverse state detector for detecting a traffic signal which, if descrambled, would be detected by the alarm indication signal detecting means as an alarm indication signal, and in response thereto, for resetting the scrambler means to avoid generation of such a scrambled signal.

26. A network terminating unit as in claim 23 in which the scrambler means comprises a self-synchronous scrambler.

27. A network terminating unit as in claim 23 in which the scrambler means comprises a four stage scrambler.

28. A communications system comprising at least two network terminating units as in claim 23.

29. A network terminating unit as in claim 23 further comprising:
   means for inputting a traffic signal to the path for transmission thereby, and
   scrambler means for scrambling the traffic signal prior to transmission on the path.

\* \* \* \* \*